W. R. TURNBULL.
METHOD OF CONSOLIDATING WOOD BY COMPRESSION.
APPLICATION FILED DEC. 4, 1919.

1,403,722.

Patented Jan. 17, 1922.

INVENTOR
W. R. TURNBULL
BY
ATTY'S

UNITED STATES PATENT OFFICE.

WALLACE RUPERT TURNBULL, OF ROTHESAY, NEW BRUNSWICK, CANADA.

METHOD OF CONSOLIDATING WOOD BY COMPRESSION.

1,403,722. Specification of Letters Patent. Patented Jan. 17, 1922.

Application filed December 4, 1919. Serial No. 342,454.

*To all whom it may concern:*

Be it known that I, WALLACE RUPERT TURNBULL, a subject of the King of Great Britain, a resident of the town of Rothesay, Province of New Brunswick, Dominion of Canada, have invented certain new and useful Improvements in Methods of Consolidating Wood by Compression, of which the following is a specification.

This invention relates to improvements in a method of preparing wood by compression so that while its density is increased its strength will be increased in a greater proportion, and thus the wood is adapted for use under conditions in which great strength is required in a small compass.

I have discovered that when natural wood is compressed in a direction across the grain or fibres, and parallel, or approximately parallel, to its annular rings, it is capable of withstanding a very great pressure, far exceeding its ordinary elastic limit in this direction, without seriously injuring the essential structure of the wood.

The wood so prepared has its strength increased in a greater proportion than its density is increased, and it is therefore possible to produce an artificial wood by this process or method, in which the elastic limit is greatly increased not only for stresses acting in the direction of the original compression load, but for other stresses such as end compression, bending, tension, shear, and the like.

This artificially prepared wood may have a greater strength than a natural wood of the same density, and may be used whenever it is desirable to use a wood of great strength in small compass, such as the laminæ of wooden air propellers, the plugs or sleeves of variable pitch, air propellers, etc.

It may also be used to advantage whenever it is desirable to employ a wood that is not liable to shrinkage, such as a wood exposed to heat, the liners of marine propeller shaft bearings, etc., for in the case of the artificially compressed wood not only is the strength increased, but there is a tendency for it to swell and not to shrink even when exposed to heat, and this may sometimes be of great advantage in certain cases of required use.

According to this invention the wood may be compressed across the grain and parallel, or approximately parallel to the direction of the annular rings, and this may be done either simply between flat plates, in which case the sides will bulge, or it may be done in a mould in which the sides are prevented from bulging, or in a mould in which both the sides and ends are prevented from bulging.

The accompanying illustrations show means whereby this consolidation of the wood is brought about, the annular rings being shown by dotted lines.

Figure 1:
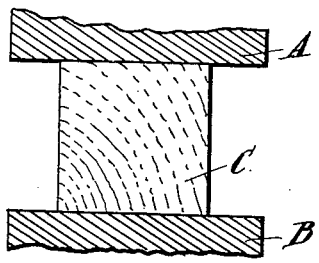
Figure 1 shows a simple method of compressing the wood between pressure plates.

In Figure 1 A and B represent pressure plates movable towards each other and C represents a piece of wood under compression by the said plates.

The wood in this case may bulge laterally.

Figure 2:
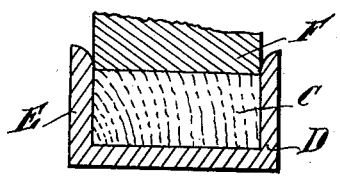
Figure 2 shows a method of compressing the wood in a mould with sides to prevent any bulging of the sides of the wood.

In Figure 2 the block C is located in a mould D having side walls E but open at the ends and a movable plate F compresses the block C in the mould D, the side walls E preventing bulging of the wood laterally, but as the mould is open at the ends, end bulging may take place.

Figure 3:
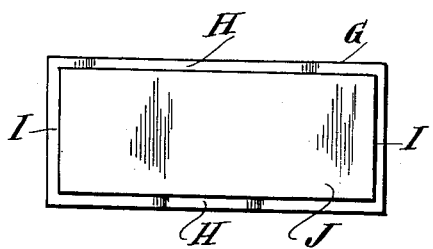
Figs. 3 to 5 show a method of compressing the wood in a mould having sides and ends to prevent bulging of the sides and ends of the wood being treated.
Figure 4:
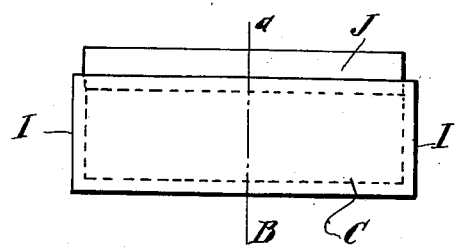
Figure 5:
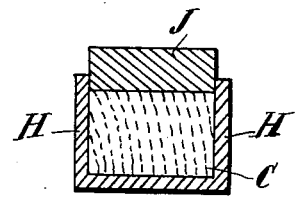

Figs. 3 to 5 show a plan view, a side view, and a section on the line $a$—$b$ respectively of a mould for restricting side and end bulging. The mould G is provided with side walls H and end walls I and the block C is located in the mould and a pressure plate J is utilized for compressing the block of wood in the mould.

In this case compression takes place without lateral or end bulging of the block of wood.

Wood treated in this manner is increased in density and has its strength increased in a greater proportion than its density for all stresses to which the wood may be subjected, so that a homogeneous product is thus obtained which will not shrink even when exposed to heat.

What I claim as my invention:

The herein described method of preparing blocks of wood having surfaces transverse to the annular rings in the wood, which comprises enclosing such blocks in such a manner as to prevent their distortion lengthwise to the grain and at right angles to the rings, and applying pressure to such rings so as to reduce or distort said annular rings without substantial variation of the dimension of the block lengthwise of the grain or at right angles to the annular rings.

In witness whereof I have hereunto set my hand in the presence of two witnesses.

WALLACE RUPERT TURNBULL.

Witnesses:
 HENRY F. PUDDINGTON,
 HENRY W. ORWELL.